(12) United States Patent
Kleinhans et al.

(10) Patent No.: US 12,128,627 B2
(45) Date of Patent: Oct. 29, 2024

(54) METHOD AND DEVICE FOR POST-TREATMENT OF PARTICLES CARRIED IN A PROCESS GAS AND FILTER THEREFOR

(71) Applicant: EOS GmbH Electro Optical Systems, Krailling (DE)

(72) Inventors: Ulrich Kleinhans, Prittriching (DE); Philip Stroebel, Weidenbach (DE); Sven Pawliczek, Gilching (DE); Johannes Rumpel, Dasing (DE)

(73) Assignee: EOS GmbH Electro Optical Systems, Krailling (DE)

( * ) Notice: Subject to any disclaimer, the term of this patent is extended or adjusted under 35 U.S.C. 154(b) by 216 days.

(21) Appl. No.: 17/299,016

(22) PCT Filed: Dec. 11, 2019

(86) PCT No.: PCT/EP2019/084749
§ 371 (c)(1),
(2) Date: Jun. 2, 2021

(87) PCT Pub. No.: WO2020/120623
PCT Pub. Date: Jun. 18, 2020

(65) Prior Publication Data
US 2022/0118513 A1    Apr. 21, 2022

(30) Foreign Application Priority Data

Dec. 12, 2018 (DE) .......................... 102018221575.8

(51) Int. Cl.
*B29C 64/371* (2017.01)
*B01D 46/00* (2022.01)
(Continued)

(52) U.S. Cl.
CPC ........ *B29C 64/371* (2017.08); *B01D 46/0093* (2013.01); *B22F 1/142* (2022.01);
(Continued)

(58) Field of Classification Search
CPC ... B29C 64/371; B29C 64/255; B29C 64/153; B01D 46/0093; B22F 1/142; B22F 1/16;
(Continued)

(56) References Cited

U.S. PATENT DOCUMENTS 5,527,019 A    6/1996   Schwarz
5,571,298 A   11/1996   Buck
(Continued)

FOREIGN PATENT DOCUMENTS

CA      3012328 A1    9/2018
CN    102301101 A    12/2011
(Continued)

OTHER PUBLICATIONS

PCT Search Report for Application No. PCT/EP2019/084749 dated Mar. 17, 2020, 2 pages.
(Continued)

*Primary Examiner* — Rebecca Janssen
(74) *Attorney, Agent, or Firm* — Polsinelli PC

(57) ABSTRACT

Disclosed is a method for the post-treatment of particles carried along in a process gas of a device for the generative manufacturing of three-dimensional objects, wherein the particles are conducted to a filter chamber. An oxidant is added to the particles and that an oxidation reaction of the particles with the oxidant is initiated.

16 Claims, 4 Drawing Sheets

(51) Int. Cl.
  *B22F 1/142* (2022.01)
  *B22F 1/16* (2022.01)
  *B22F 10/77* (2021.01)
  *B33Y 40/20* (2020.01)

(52) U.S. Cl.
  CPC ............... *B22F 1/16* (2022.01); *B22F 10/77* (2021.01); *B22F 2201/10* (2013.01); *B22F 2202/11* (2013.01); *B33Y 40/20* (2020.01)

(58) Field of Classification Search
  CPC .. B22F 10/77; B22F 2201/10; B22F 2202/11; B22F 2999/00; B22F 10/85; B22F 10/28; B22F 2201/03; B22F 1/145; B33Y 40/20; B33Y 10/00; Y02P 10/25
  See application file for complete search history.

(56) References Cited

U.S. PATENT DOCUMENTS

| | | | |
|---|---|---|---|
| 2001/0000724 A1 | 5/2001 | Choate et al. | |
| 2003/0175174 A1 | 9/2003 | Schneider | |
| 2005/0147548 A1* | 7/2005 | Shiban | B01D 53/46 422/171 |
| 2006/0236855 A1 | 10/2006 | Handte | |
| 2011/0265893 A1 | 11/2011 | Scott et al. | |
| 2011/0289903 A1 | 12/2011 | Döring | |
| 2013/0255229 A1 | 10/2013 | Doering | |
| 2018/0065081 A1 | 3/2018 | Herzog et al. | |
| 2018/0244034 A1* | 8/2018 | Sutcliffe | B29C 64/255 |
| 2019/0039313 A1 | 2/2019 | Fey et al. | |
| 2021/0276098 A1 | 9/2021 | Hensen et al. | |

FOREIGN PATENT DOCUMENTS

| | | | |
|---|---|---|---|
| CN | 203867667 U | | 10/2014 |
| CN | 105921747 A | | 9/2016 |
| CN | 105965016 A | | 9/2016 |
| CN | 206392860 U | | 8/2017 |
| CN | 206853306 U | | 1/2018 |
| CN | 207871882 U | | 9/2018 |
| DE | 3015976 | | 11/1981 |
| DE | 4130640 | | 3/1993 |
| DE | 4305915 | | 11/1994 |
| DE | 10254807 A1 | | 6/2004 |
| DE | 102016201812 | | 8/2017 |
| DE | 102017207415 | | 11/2018 |
| DE | 102017207415 A1 | * | 11/2018 |
| EP | 1527807 | | 5/2005 |
| EP | 2644857 A2 | | 10/2013 |
| EP | 2774703 A1 | | 9/2014 |
| FR | 2523469 | | 9/1983 |
| JP | H07253015 | | 10/1995 |
| JP | 1994093309 A | | 11/1995 |
| JP | 2014168796 A | | 9/2014 |
| JP | 2017538038 A | | 12/2017 |
| JP | 2018048396 A | | 3/2018 |
| JP | 2021531406 A | | 11/2021 |
| RU | 2011111683 | | 9/2009 |
| WO | 2011003497 A1 | | 1/2011 |
| WO | 2012123618 A1 | | 9/2012 |

OTHER PUBLICATIONS

German Search Report for Application No. 102018221575.8, 9 pages.
English Translation of Japanese Office Action dated Dec. 13, 2023.

* cited by examiner

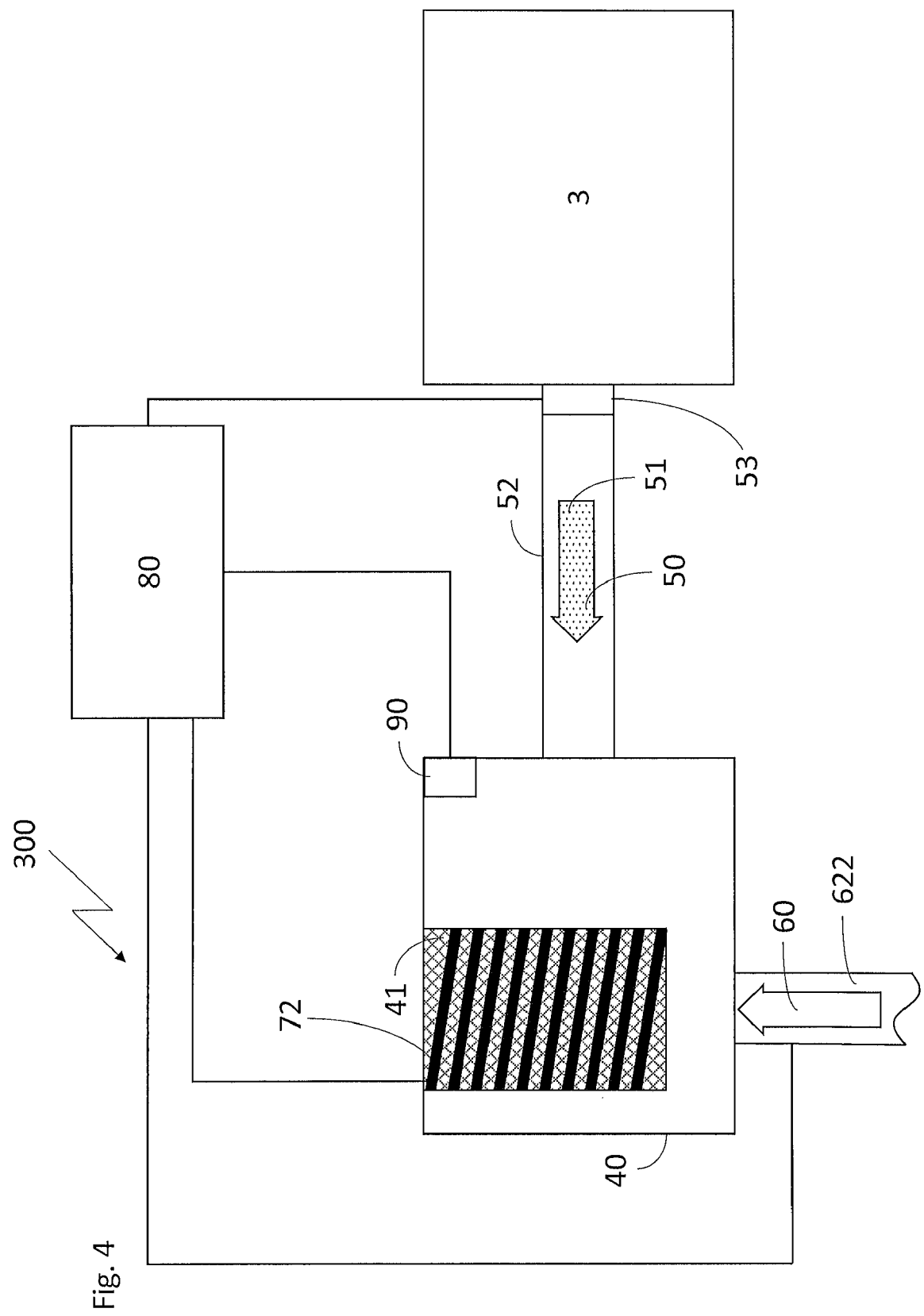

METHOD AND DEVICE FOR POST-TREATMENT OF PARTICLES CARRIED IN A PROCESS GAS AND FILTER THEREFOR

TECHNICAL FIELD OF THE INVENTION

The present invention relates to a method and a device for a post-treatment of particles carried along in a process gas of a device for the generative manufacturing of three-dimensional objects and a filter therefor.

BACKGROUND OF THE INVENTION

Methods and devices for the generative manufacturing of three-dimensional objects are, for instance, used for rapid prototyping, rapid tooling, and additive manufacturing. An example of such a method is known as "selective laser sintering or laser melting". Herein, a thin layer of pulverulent building material is repeatedly applied and the building material in each layer is selectively solidified by selectively irradiating the positions corresponding to the cross-section of the object to be built in the respective layer by a laser beam.

In the case of such a manufacture of three-dimensional objects, particles are carried along in a process gas withdrawn from the process chamber, in particular metal condensates when metallic building materials are used, which are partly highly reactive and react under high temperatures and high heat release. This may cause uncontrolled fires at the filter or dust explosions, especially in the proximity of filters where the particles carried along in the process gas accumulate. This risk is increased if, for example, an associated filter chamber is opened to change the filter(s), which increases the probability of a reaction due to the associated increased air supply.

EP 1 527 807 proposes an inertisation for separating dust components from an explosive dust-air mixture by using additive particles with which filter plates are loaded. Herein, the amount of additive particles is selected in such a way that the mixture of these particles with an introduced dust does not constitute a combustible mixture at least until reaching an upper filling level of a dust container. Particles of calcium carbonate and silicon dioxide are mentioned as additive particles in connection with aluminium dust. By using additional particles, however, in addition to providing them, a faster approach to the upper filling level is accepted, so that the dust container has to be emptied more often.

SUMMARY OF THE INVENTION

The object of the present invention is to provide an alternative or improved method and an alternative or improved device, respectively, for a post-treatment of particles, in particular metal condensates, carried along in a process gas of a device for the generative manufacturing of three-dimensional objects, and a filter therefor, wherein the risk of uncontrolled particle combustion is minimised.

This object is achieved by a method according to claim 1, a post-treatment device according to claim 7, and a filter according to claim 15. Further developments of the invention are specified in each of the dependent claims. Herein, the method may also be further developed by the features of the devices set out below or in the dependent claims, or vice versa, or the features of the devices may also be used each with the other for further developments.

In the method according to the invention for a post-treatment of particles carried along in a process gas of a device for the generative manufacturing of three-dimensional objects, wherein the particles are conducted to a filter chamber, an oxidant is added to the particles and an oxidation reaction of the particles with the oxidant is initiated.

Process gas is understood in this context as the gas discharged, in particular extracted, from a process chamber, which depending on the manufacturing process, may also be or include an inert gas. In the process gas, both unsolidified components of a building material and process by-products such as condensates, for example metal condensates, may be contained. Such components carried along in the process gas are summarised under the term "particles", wherein it is preferred not to feed the unsolidified components of the building material to the post-treatment method according to the invention, or to feed them only in smaller amounts than contained in the process gas when it leaves the process chamber. This may be achieved, for example, with the aid of a cyclone separator, which effectively separates the unsolidified components of the building material from the process by-products, at least for the most part.

Basically, "oxidation" in the context of the invention is understood according to the common broad chemical definition, i.e. as a reaction involving the donation of electrons by an electron donor and the acceptance of electrons by an electron acceptor. In the oxidation reaction, preferably condensate particles as electron donors donate electrons to the oxidant as electron acceptor. In particular, the oxidation reaction takes place with oxygen as acceptor, for example atmospheric oxygen or an alternative oxygen-containing carrier gas or reactive gas as oxidant. Herein, the form of oxygen is not limited to molecular oxygen, i.e. $O_2$, but also includes other forms such as ozone, i.e. $O_3$, or other elemental and/or molecular compounds containing oxygen atoms whose oxygen component may be used as an oxidant. Other oxidants include, inter alia, hydrogen peroxide $H_2O_2$ and its adducts such as sodium percarbonate, oxygen-containing anions (oxyanions) of transition metals in high oxidation states such as permanganate $MnO_4^-$ or dichromate $Cr_2O_7^{2-}$ and chromium(VI) oxide (Jones oxidation), metal ions such as $Ce^{4+}$, noble metal ions such as those of silver and copper, anions of halogen oxyacids such as bromate $BrO_3^{3-}$ and hypochlorite $ClO^-$, sulphur, and the halogens fluorine, chlorine, bromine, and iodine. Through the oxidation reaction, the fire or explosion tendency of the particles is either at least sufficiently inhibited or the particles are "burnt" in a targeted and thus controlled manner, i.e. reacted off.

For the targeted oxidation reaction, the oxidation reaction is preferably initiated by a change in a particle environment and/or targeted energy input, i.e. deliberately initiated. For this purpose, for example, the oxidant and/or the condensate particles and/or the unsolidified building material, as described later, and/or the particle environment may be heated to a predetermined temperature. The targeted heating of the particles, for example in comparison to the heating of the particle environment, reduces the temperature in the post-treatment device in such a way that overheating is thereby counteracted. Alternatively or additionally, in addition to heating, for example by means of a tube heater, a heat exchanger, a convective heat transfer, or an infrared radiant heater, other forms of energy input to initiate or support the oxidation reaction or to influence the oxidant and/or the particles are also possible, for example by photochemical reaction with flash light, plasma, electric arc, electrostatic discharges or eddy currents, catalysts for atomic splitting of oxygen as oxidant, or by adding activating agents to activate metal condensate surfaces, or by electrolysis. Accordingly, the method according to the invention according to its general concept does basically not involve a compulsory sequence of the steps of supplying the oxidant and initiating an oxidation reaction. In other words, the initiation may also take place before the addition of the oxidant or vice versa. The sequence of the process steps may result from the respective embodiments. It is also possible to initiate the oxidation reaction solely with the supply of the oxidant as well as with the sole supply of energy from one of the above-mentioned energy sources, wherein in other words, only one of the above-mentioned method steps is sufficient by carrying out the method according to the invention in the sense of a controlled oxidation of process by-products.

It is noted at this point that initiating an oxidation reaction according to the invention refers to the fact that an oxidation reaction is specifically started or supported. A spontaneous oxidation may in principle be assumed as long as the reactive particles are surrounded by oxidants, such as oxygen components in the process gas carrying the particles or in admixtures, by a supply of the process gas and an oxidant supply through environments containing such components—for example because the supply of the process gas to the filter chamber or the filter chamber itself is not airtight or flooded with gas containing such components. However, this is primarily limited to passivation through the formation of oxide layers on the particles and only leads to exothermic oxidation reactions in the sense of a burn-off in few cases, such as the aforementioned opening of the filter chamber and the resulting suddenly supplied increased oxygen content. However, such a burn-off then proceeds in an uncontrolled manner. However, the invention is directed to controlled oxidation reactions which are triggered or supported by the targeted initiation of an oxidation reaction. The method according to the invention proceeds in a particularly controlled manner if the particles are surrounded by a substantially inert atmosphere, which limits or completely inhibits the reaction of the particles, until the targeted initiation of an oxidation reaction or until the supply of the oxidant and/or until the initiation of the above-mentioned energy input. This may be achieved, for example, in that the process gas carrying the particles is itself an inert gas and in that in the supply of the process gas and/or in the filter chamber, mixing with oxidants potentially contained therein is avoided as far as possible except for the oxidants specifically added, or in that the supply of the process gas and/or the filter chamber themselves contain inert gas, for example are flooded therewith. If the process gas itself is not an inert gas, it may be mixed with inert gas in the supply and/or in the filter chamber to such an extent that a reaction of the particles with their particle environment is reduced or completely inhibited until the targeted oxidant addition.

The oxidation reaction does not necessarily have to be provided for all particles, but may be limited to those particles that cause a corresponding risk of fire or explosion due to their size or surface-to-volume ratio, their reaction properties, and/or their proportional amount. In connection with an energy input to initiate the oxidation reaction, in particular with regard to heating, conglomerations or agglomerations of the particles up to sintering can also occur, by which the active surface may be reduced to a non-hazardous level. Such an effect may also be caused by the exothermic oxidation reaction. Preferably, as mentioned above, unsolidified components of a building material may be separated prior to the oxidation reaction or, preferably, condensate particles may be separated from the particle environment carried along in the process gas, for example by means of centrifugal separators, in order to be recycled, such that the oxidation reaction is thus essentially directed at the condensates as particles. These are often present, for example, as agglomerated particles with primary particle diameters in the range of 80 to 120 nm, as primary particles in the range of 5 to 50 nm.

In this way, for instance, the use of additive particles may be omitted. In addition, the general fire and explosion hazard may be reduced, for instance in the case of burn-off at not too high temperatures, with preferably no or only a slight change in the particle size. In this respect, the fire and explosion hazard that may continue to exist after the filter change upon disposal or other further treatment of the filters and the particles or the particle residues is also reduced compared to a filter change without prior post-treatment of the particles entrained in the process gas.

Preferably, the supplied oxidant is supplied to a particle environment, which is preferably provided in a flowable form, more preferably in a gaseous form, in particular in the form of inert gas.

The flowable particle environment supports the uniform distribution of the oxidant in the particle environment. The provision of a particle environment in gaseous form makes direct use of the process gas possible and is also advantageous with regard to the flow characteristics of gases in the context of the design of the device. Moreover, by using an inert gas as the particle environment, the reaction of its particles is prevented or at least inhibited until a targeted oxidation reaction occurs.

In this context, the addition of the oxidant is an enrichment of the particle environment with an oxidant, in particular in a region of the intended oxidation reaction.

The particle environment may be formed by the process gas itself carrying the particles or by a medium contained in the supply of the process gas and/or the oxidant supply and/or the filter chamber, or by a mixture thereof. Due to the flowability of the particle environment, in particular in gaseous form, the oxidant can be well distributed in the particle environment. If an inert gas is provided as part of the particle environment, for instance the reaction risk of the condensate particles and/or the amounts of unsolidified building material may be reduced by the inert environment until the oxidation reaction is initiated in a targeted manner and/or the oxidant is added in a targeted manner.

Preferably, the oxidant is provided in an appropriate state of matter, preferably flowable, more preferably gaseous, in particular in the form of oxygen. However, depending on the oxidation reaction conditions, solids are also possible as oxidants.

The term "appropriate" refers to the purpose of the oxidation of the particles or of the particles to be supplied to the oxidation reaction, so that a substantially complete oxidation reaction in this state of matter is to be assumed for these particles. The flowability may also here, for example, facilitate the distribution of the oxidant around the particles. In the case of a gaseous particle environment, uniform distribution is particularly well achieved by a gaseous oxidant.

The use of oxygen as an oxidant appears appropriate in many respects, such as due to its availability, especially with regard to the use of atmospheric oxygen, the high affinity of many particle materials to oxygen in the sense of an oxidation reaction, or also in the sense of an explicitly intended burn-off.

Preferably, a volume fraction of the oxidant, in particular oxygen, of at least 0.01 vol. % and at most 20 vol. %, preferably at least 1 vol. %, particularly preferably at least 4 vol. %, and/or preferably at most 10 vol. %, particularly preferably at most 6 vol. %, relative to the particle environment, is added to the particles.

In this way, for example, an uncontrolled chain reaction can be prevented and explosion protection within the meaning of the ATEX regulations can be achieved.

Preferably, the particles are heated, in particular to a temperature of at least 50° C. and at most 650° C., preferably at least 75° C., more preferably at least 100° C. and/or preferably at most 200° C., more preferably at most 150° C.

By heating the particles, for example, an oxidation reaction may be initiated or supported. The heating may take place before, after, or also during the addition of the oxidant. The latter is particularly the case if the place of addition of the oxidant is also intended as the place of the oxidation reaction, so that heating takes place efficiently. For various reasons, such as design-related requirements, heating may also take place upstream or downstream of the oxidant addition.

As already mentioned, in that the heating is not directed at the gas of the particle environment but at the particles, overheating of the post-treatment device described later is avoided, in particular in the case of heating over an extended period of time. For example, when using a radiant heater, heat is essentially only absorbed by the particles, wherein this heat absorption is not significant compared to the amount of heat in the gas. Furthermore, it is also conceivable in principle that the gas of the particle environment is recirculated and/or actively cooled. At this point, it is noted that the term "gas" in relation to the particle environment includes the process gas and a gaseous oxidant as well as other gases present in the particle environment as well as a mixture of such gases because this is not relevant with regard to particle heating as such, but is to be considered in the context of the oxidation reaction.

Depending on the material, the heating temperature may adopt comparatively higher values, such as in the range of 200° C. in the case of AlSi10Mg, wherein in particular the ignition temperature of the particles may be exceeded by the heating and/or the ignition temperature of the filter as a result of the heating, provided that the reaction takes place in the particle environment without filter contact and the upper limit of the ignition temperature is again fallen below before filter contact. Temperature-insensitive options are metal or ceramic filters, for which the ignition temperature is higher.

Preferably, the oxidant content surrounding the particles, in particular the oxygen content, and/or the temperature of the particle environment and/or of the particles themselves is or are detected and influence(s) the control of the oxidant supply and/or of a heating device and/or of an exhaust.

The term "detect" is not limited to a measurement of the corresponding values, but may also include their derivation from other sources of information, such as parameter settings. However, a measurement of the values may, for example, reflect setting-independent status information. According to the detected values or a predetermined deviation from target values, the intervention influencing the control of the oxidant supply and/or the heating device and/or the exhaust may lie in a deactivation of at least one of these devices. In an advantageous further development, however, the intervention corresponds to a closed-loop control or readjustment control in order to bring the process back into the predetermined range of the target values. Ultimately, however, depending on the degree of a deviation and the risks associated therewith, both possibilities of intervention may also be provided, for example a control in the case of deviations smaller than or equal to a predetermined deviation and deactivation in the case of exceeding this deviation.

The post-treatment device according to the invention for a post-treatment of particles carried along in a process gas of a device for the generative manufacturing of three-dimensional objects, wherein the particles are fed to a filter chamber, comprises an oxidant supply for an addition of oxidant to the particles, and a device for initiating an oxidation reaction of the particles with the oxidant.

The oxidant supply may be in the form of a conduit capable of supplying an oxidant from an oxidant reservoir to the particles, or may be in the form of an oxidant passageway only. The device for initiating an oxidation reaction may comprise, for example, devices for introducing an energy, in particular for raising the temperature, or inlets or ducts for the addition of catalysts, surface activating agents, and/or electrolytes, as already extensively mentioned above.

As already stated with respect to the method according to the invention, the post-treatment device may, for example, achieve a selective oxidation of the particles in order to reduce a risk of fire and explosion.

Preferably, the oxidant supply is associated with the supply of the process gas and/or connected directly or indirectly to the filter chamber.

The supply of the process gas is understood as the supply of the process gas to the filter chamber. If the oxidant supply is associated with the process gas supply, for example, having one oxidant supply and one process gas supply for multiple filter chambers, these multiple filter chambers may be served, since the oxidant supply does not have to be provided for each chamber. Conversely, for example, having one filter chamber and multiple process gas supplies, an oxidant supply connected to the filter chamber may be advantageous. An optional connection or arrangement option is also conceivable to increase flexibility. The connection to the filter chamber does not necessarily have to be direct, but may also be provided indirectly, for example via functional intermediate sections, such as valve sections.

Furthermore, by connecting the oxidant supply to the process gas supply, the targeted oxidation reaction of the particles can take place, for example, before the particles reach the filter chamber. Conversely, if the oxidant supply is connected to the filter chamber, a targeted oxidation reaction may be limited to the region of the filter chamber.

Preferably, the oxidant supply is essentially directed towards at least one filter in the filter chamber.

In this way, it may for example be achieved that the particles reaching the at least one filter may be subjected to an oxidation reaction or that the oxidation reaction may take place in the region of the filter, such that the deposition of the oxidised particles on the filter is favoured. Especially with regard to the later described embodiment of the filter with an energy input source, the direction of the oxidant supply towards the filter in the filter chamber turns out to be advantageous.

Preferably, a control, in particular a closed-loop control, is provided which controls the oxidant supply in such a way that it supplies the oxidant continuously, periodically or variably.

A continuous addition of the oxidant may provide a minimum oxidant concentration. However, it may also be advantageous not to further supply the oxidant for instance in the beginning after the initiation of the oxidation reaction but to allow the oxidation reaction to proceed with the amount supplied up to that moment. A variable addition in the sense of an event-dependent or state-dependent addition is advantageous in many cases in terms of control, especially with regard to consumption values and process control in the case of fire and explosion hazards. In the sense of a periodic or variable addition, the control may, for example, restrict or block the supply of the process gas, such as by switching off an exhaust for the supply or by means of corresponding closing elements. In this way, it is possible to allow the oxidation reaction to take place in a quasi-closed system. In particular in the case of devices for avoiding feedback to the process chamber, as may preferably be achieved by means of closure elements, an undesired oxidation reaction reaching into the process chamber can be prevented. Such restriction or blocking does not need to be connected to the condition that no additional amount of particles carried in the process gas is introduced into the oxidation reaction, but may also, for instance in the case of a post-oxidation, suspend a further addition of process gas influencing the oxidation process, thus also without particles. If an inert gas is used as the process gas, this could, for example, otherwise reduce the oxidation capability again.

Preferably, the post-treatment device comprises at least one energy input source whose energy input is effected from outside the filter chamber, in particular through a radiation-transparent portion in an interior of the filter chamber, and/or from inside the filter chamber, in particular through an energy input element integrated in the at least one filter.

By the energy input source, an energy is supplied to the oxidant and/or the particles and/or the particle environment to initiate the oxidation reaction. For example, an activation energy is supplied to the particles and/or an energy to increase the temperature in order to increase the likelihood that the activation energy is provided by of the particles themselves.

In the case of an arrangement outside the filter chamber, the energy input may be directed via a radiation-transparent portion, for instance, to the particles without heating up further components or media except for essentially negligible absorption phenomena.

Alternatively or additionally, an arrangement inside the filter chamber, in particular an energy input element integrated in the at least one filter, may for example offer the advantage of introducing the energy input in a more locally targeted manner.

However, it is also conceivable to have an energy input source whose energy input takes place from outside the supply of the process gas, in particular through a radiation-transparent portion into an interior of the supply of the process gas, and/or inside the supply of the process gas.

In the case of an energy input source associated with the supply of the process gas, the energy input source may also be simply added in a retrofitting manner by inserting an intermediate piece, for example as a retrofit kit, comprising the energy input source in its interior or exterior and/or comprising a radiation-transparent portion into the supply of the process gas, or by adding such an element as a coupling piece. In addition to the energy input source, the corresponding intermediate or coupling piece may also comprise an inlet for the addition of the oxidant. Alternatively or additionally, the intermediate or connecting piece comprises sensors for process monitoring.

Preferably, the at least one energy input source is configured as a heating device and may preferably be controlled and/or regulated by the control, in particular the closed-loop control.

The term "heating device" is understood to mean a device that makes it possible to heat the oxidant, the particles, and/or the particle environment. Such a heating device may be used as a device to initiate an oxidation reaction in the sense of providing an activation energy as well as in the sense of temperature-dependent oxidation processes. In addition, for example, the conglomeration or agglomeration and/or the sintering of the particles may also be supported by providing a predetermined temperature level. By the connection to the control, a temperature profile may be predetermined which is directed to the different mechanisms of action in each case. In a comparable manner, the heating device may also be integrated into a control loop in order to be able to respond to values that deviate from the control settings or to be able to act according to regulation parameters.

The control may provide for the initiation of an oxidation reaction via the energy input source or generally the device for initiating the oxidation reaction periodically at predetermined time intervals or also event-dependent in the sense of a feedback control, such as reaching a predetermined amount of particles, or on request by an operator, for example before opening the filter chamber. With regard to the latter example, it may also be provided that the filter chamber may only be opened if an oxidation reaction has been initiated beforehand and its completion may be assumed to have taken place or a process monitoring confirms this, optionally depending on a detected particle amount in the filter chamber before the oxidation reaction as a trigger of the condition or afterwards in the sense of a residual amount as a release condition.

Preferably, a process monitoring is provided which monitors the oxidant content, in particular the oxygen content, and/or the temperature.

The process monitoring may be used, for example, to record process states, to output critical process states in the form of signal information or warning messages or to trigger shutdowns and/or to pass on actual values to the closed-loop control as part of a regulation process. The sensors for measuring the oxidant content or the temperature as used for process monitoring are not limited to detecting these values. Alternatively or additionally, the amount of particles entrained in the process gas may also be monitored.

As a device for process monitoring, the process monitoring may form its own independent unit or the detection of variables to be monitored may be carried out by individual sensors which are combined to form a process monitoring unit, for example in the control. The detection of the values to be monitored has preferably to be provided with spatial resolution in the sense of determining a value in a region of interest or at least in such a way that a conclusion can be drawn about the value to be monitored in a region of interest via the detected value.

Preferably, the control controls the oxidant supply and/or the heating device and/or an outlet on the basis of the process monitoring.

In response to the values detected by process monitoring, the oxidant addition may be increased, the temperature may be increased and/or the extraction and thus the addition of the process gas may be reduced, if for example an oxidant content that is too low is detected. The control of the addition of the process gas may on the one hand be directed to the amount of particles carried in the process gas and/or on the other hand to the amount of the process gas carrying the particles, which in turn has an influence on the concentration of the oxidant upon its addition. The process monitoring and control thus form a control loop.

The filter according to the invention for use in a method according to the invention or a device according to the invention comprises a heating device which is configured as a resistance heater, in particular a wire mesh and/or a heating wire.

By configuring the heating device as a resistance heater, a simple implementation can be made. In particular, a wire mesh is suitable, which may be configured, for example, as a grid, net, or irregular structure. An irregular structure may, for example, have different temperature ranges depending on the local structure density. The wire mesh or the heating wire may be inserted into the filter fabric.

Because the filter comprises the heating device, it is again simplified to retrofit conventional filter chambers into a post-treatment device or to apply the method for post-treatment. Alternatively or additionally, the filter may also be provided to provide the oxidant or the agent or further agents to initiate an oxidation reaction. For example, in terms of providing the oxidant, the filter may be formed of or comprise materials that act as electron acceptors. In addition to the heating device, the filter may also act as a catalyst to initiate an oxidation reaction or assist the formation of activation surfaces.

Initiating the oxidation reaction at or in the area of the filter may also be favourable in that the largest particle accumulations are to be expected there. Here, an oxidation reaction may be initiated periodically or when a critical quantity is reached before the filter chamber is opened, in particular as part of a process monitoring or closed-loop control based on the determined boundary conditions.

BRIEF DESCRIPTION OF THE DRAWINGS

Further features and expediencies of the invention follow from the description of embodiments with reference to the appended drawings.

FIG. 4 is a schematic view, partially shown as sectional view, of a post-treatment device for the post-treatment of particles carried along in a process gas of a device for the generative manufacturing of a three-dimensional object in connection with a device according to FIG. 1 according to a third embodiment of the invention, in which in an embodiment the supply of the oxidant is directed to the filter and the filter comprises the device for initiating the oxidation reaction.

DETAILED DESCRIPTION OF THE EMBODIMENTS

Figure 1:
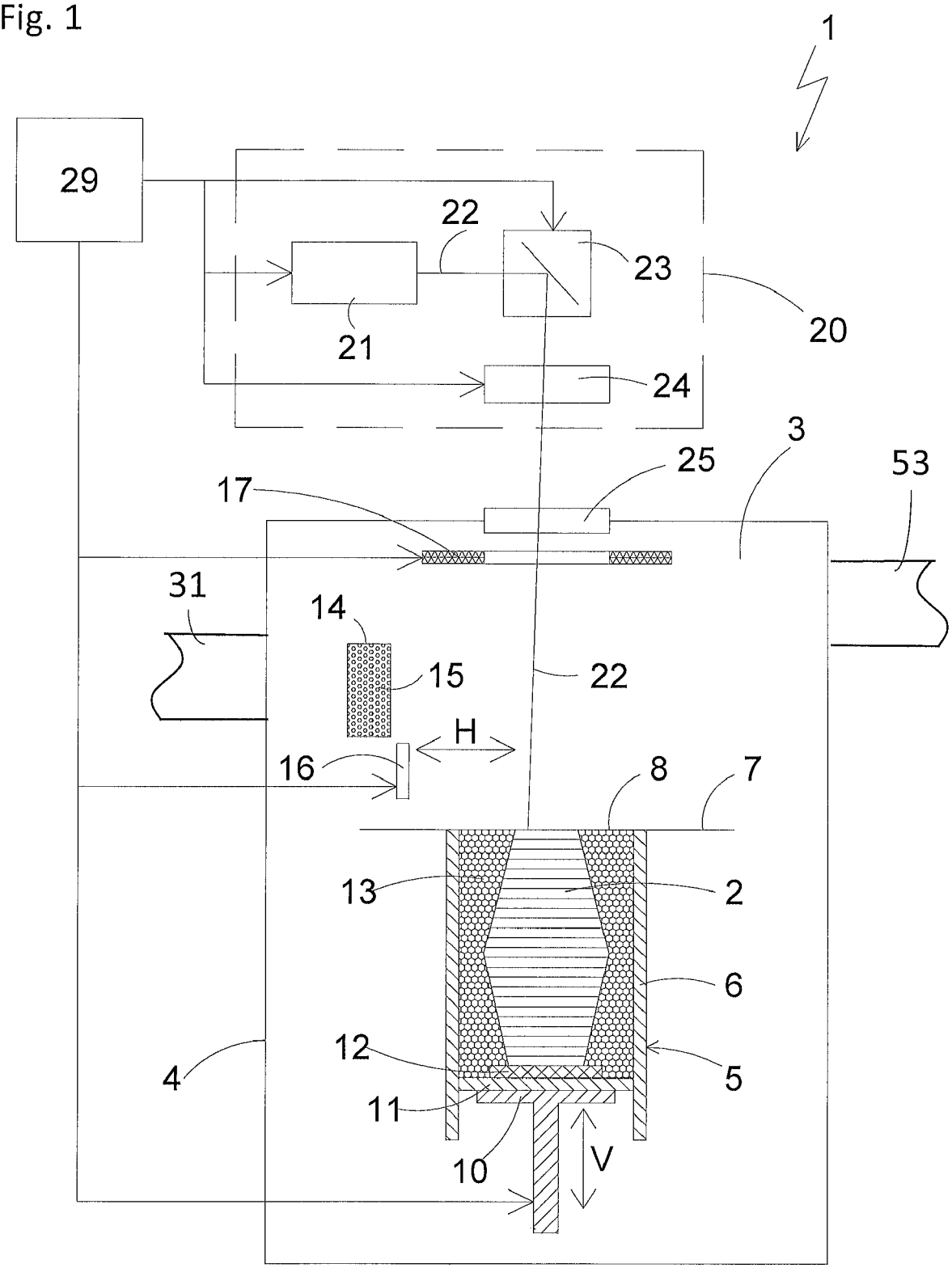
FIG. 1 is a schematic view, partially shown as sectional view, of a device for the generative manufacturing of a three-dimensional object.

In the following, a device for the generative manufacturing of a three-dimensional object is described with reference to FIG. 1. The device shown in FIG. 1 is a laser sintering or laser melting device 1. To construct an object 2, it contains a process chamber 3 with a chamber wall 4.

In the process chamber 3, a container 5 being open at the top having a container wall 6 is arranged. A working plane 7 is defined by the upper opening of the container 5, wherein the area of the working plane 7 that lies within the opening and which may be used for the construction of the object 2 is referred to as build area 8. In addition, the process chamber 3 comprises a process gas supply 31 associated with the process chamber 3 and an outlet 53 for the process gas.

In the container 5, a support 10, which can be moved in a vertical direction V, is arranged, at which a base plate 11, which closes the container towards its underside and therefore forms its bottom, is arranged. The base plate 11 may be a plate which is formed separately from the support 10 and which is fastened to the support 10 or it may be formed integrally with the support 10. Depending on the powder used and the process used, a building platform 12, on which the object 2 is built, may be attached to the base plate 11 as building base. The object may also be built on the base plate 11 itself, which then serves as building base. In FIG. 1, the object to be formed on the building platform 12 in the container 5 is shown underneath the working plane 7 in an intermediate state having a plurality of solidified layers surrounded by building material 13 remaining unsolidified.

The device 1 further contains a storage container 14 for pulverulent building material 15, which can be solidified by electromagnetic radiation, and a recoater 16, which is movable in a horizontal direction H, for applying layers of the building material 15 within the build area 8. Preferably, the recoater 16 extends over the entire area to be coated transversely to its direction of movement.

Optionally, a radiation heater 17, which serves to heat the applied building material 15, is arranged in the process chamber 3. As radiation heater 17, for instance an infrared emitter, may be provided.

The laser sintering device 1 further comprises an irradiation device 20 with a laser 21, which generates a laser beam 22, which is deflected by a deflecting device 23 and focused onto the working plane 7 by a focusing device 24 via a coupling window 25, which is arranged at the top of the process chamber 3 in the chamber wall 4.

Further, the laser sintering device 1 comprises a control unit 29 by way of which the individual component parts of the device 1 are controlled in a coordinated manner for executing the manufacturing process. Alternatively, the control unit 29 may be arranged partially or completely outside the device 1. The control unit 29 may comprise a CPU, the operation of which is controlled by a computer program (software). The computer program may be stored on a storage medium being separate from the device 1, from which it may be loaded into the device 1, in particular in the control unit.

Preferably, a pulverulent material is used as the building material 15, wherein the invention is in particular directed to building materials forming metal condensates. In the sense of an oxidation reaction, this includes in particular building materials containing iron and/or titanium, but also materials containing copper, magnesium, aluminium, tungsten, cobalt, chromium and/or nickel, as well as compounds containing such elements.

During operation, the support 10 is lowered by a height which corresponds to the desired thickness of the layer of the building material 15 in order to apply a powder layer. First, the recoater 16 moves to the storage container 14 and receives therefrom an amount of building material 15 which is sufficient for applying a layer. Then, it moves over the build area 8, applies thereon pulverulent building material 15 on the building base or an already previously present powder layer and spreads it into a powder layer. The application is done over at least the entire cross-section of the object 2 to be manufactured, preferably over the entire build area 8, i.e. the area defined by the container wall 6. Optionally, the building material 15 in powder form is heated to a working temperature by means of the radiation heater 17.

Subsequently, the cross-section of the object 2 to be manufactured is scanned by the laser beam 22 such that the pulverulent building material 15 is solidified at those positions that correspond to the cross-section of the object 2 to be manufactured. Herein, the powder particles are partially or completely melted at these positions by the energy introduced by the radiation such that, after cooling, they are bonded together as a solid. These steps are repeated until the object 2 is completed and may be taken out of the process chamber 3.

Figure 2:
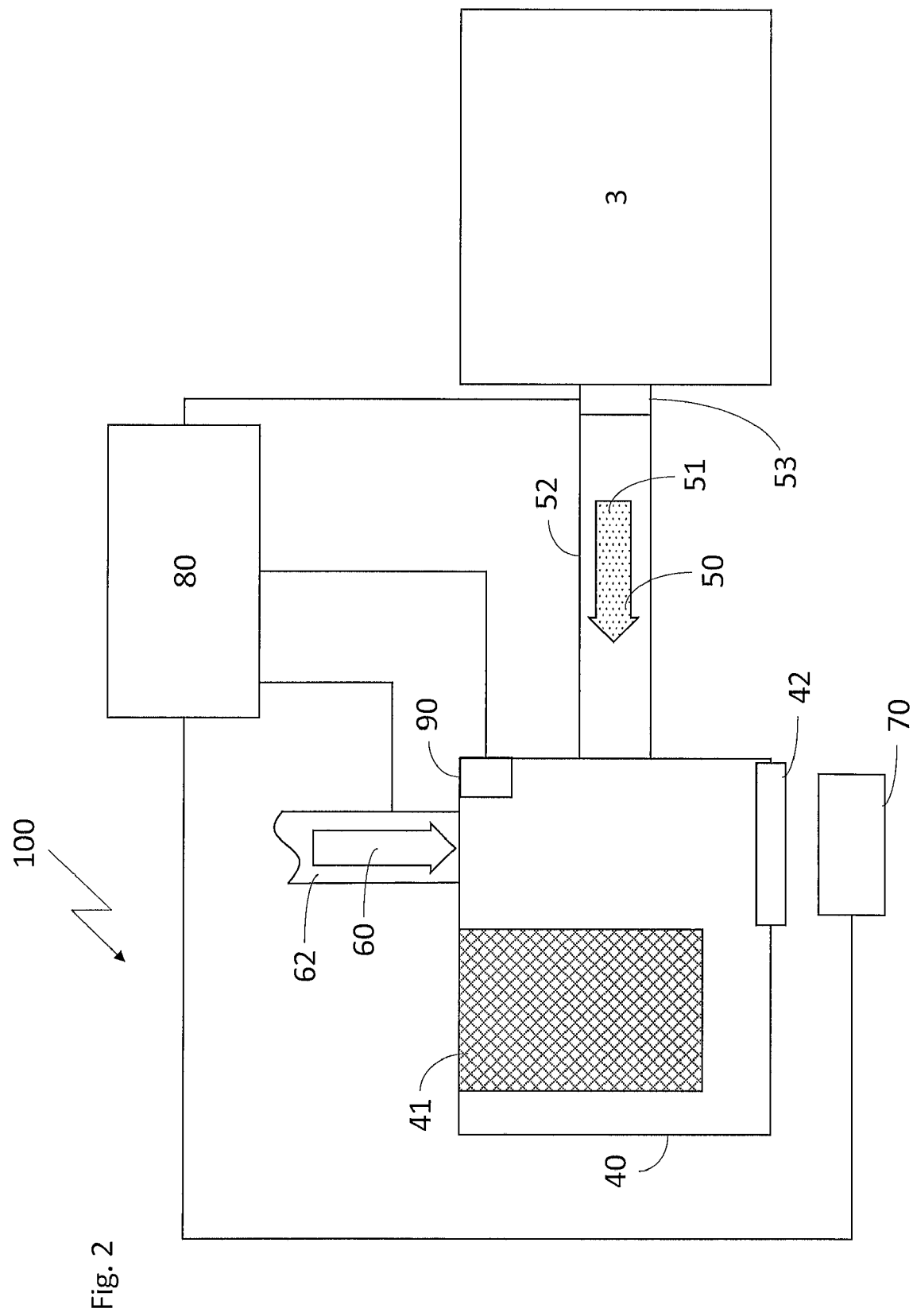
FIG. 2 is a schematic view, partially shown as sectional view, of a post-treatment device for a post-treatment of particles carried along in a process gas of a device for the generative manufacturing of a three-dimensional object in connection with a device according to FIG. 1 according to a first embodiment of the invention, in which in an embodiment the supply of the oxidant and the device for initiating the oxidation reaction may be associated with the filter chamber.

FIG. 2 is a schematic, partially sectional view of a post-treatment device 100 for post-treatment of particles 51 entrained in a process gas 50 of a device for the generative manufacturing of three-dimensional objects in connection with a device 1 according to FIG. 1 according to a first embodiment of the present invention. The particles 51 and the process gas 50 carrying the particles along are represented by the respective arrow. The process gas 50 carrying the particles 51 is let out of the process chamber 3 through an outlet 53 into the supply 52 of the process gas 50 to the filter chamber 40, for example by suction. In addition to an inlet for the feed 52 of the process gas 50 and the particles 51 contained therein, the filter chamber 40 comprises an inlet for an oxidant 60 supplied via an oxidant supply 62, also shown as an respective arrow. The oxidant feed 62 is oriented towards the process gas 50 carrying particles 51 that exits from the supply 52 in such a way that the oxidising agent 60 can penetrate the particle environment of the particles 51 in the region of the initiation of the oxidation reaction described below. As device for initiating the oxidation reaction, an energy input source 70 configured as a radiant heater is provided here, which couples its thermal radiation into the filter chamber 40 via a transparent portion 42 of the same, and it is significantly absorbed by the particles 51 entrained in the process gas 50, so that the latter are selectively heated. The supply of the oxidant 60 into the particle environment of the particles 51, in combination with the particle temperature generated by the energy input source 70, leads to an oxidation reaction in which the particles 51 burn off and/or are passivated at least in a controlled oxidation reaction to such an extent that their tendency to burn and explode is sufficiently inhibited. The process gas 50 carrying the particles 51, or now particle residues, is then drawn off through the filter 41, where the particles 51 or particle residues remain according to the filter characteristics.

The post-treatment device may further comprise a separator, which is not shown, so that particles 51 formed from unsolidified building material 13 are separated from the process gas 50 so that they are not fed to the post-treatment device.

In the embodiment according to FIG. 2, the oxidant supply 62, the supply 52 of the process gas 50 and the energy input source 70 are arranged in such a way that the oxidation reaction is initiated by the energy input source 70 in the particle environment in which the oxidant 60 meets the process gas 50 carrying the particles 51 and thereby mixes with the particle environment. Alternatively, the particles 51 entrained in the process gas 50 may first be heated to a temperature which then leads to initiation of an oxidation reaction upon contact of the particles 51 with the oxidant 60. Equally, the energy input to initiate the oxidation reaction may also take place after the mixing of the particle environment with the oxidant 60 has already taken place, provided that the oxidant content is then still sufficient. This refers to both a spatial and a temporal aspect.

In addition, the post-treatment device in FIG. 2 comprises a control 80 which can control the oxidant supply 62 and thus the amount of oxidant 60 supplied to the filter chamber, for example by valves, the outlet 53 and thus the amount of process gas 50 and particles 51 entrained therein, as well as the energy input source 70. For the control of at least one of these devices, which may be controlled by the control 80, a process monitoring 90 is provided, which monitors at least the oxidant content, the amount of particles or the temperature in the filter chamber 40, in particular spatially resolved, via one or more sensors, such as the sensors 91 and 92, which are described by way of example for FIG. 3, and which may be included here in the process monitoring 90. The closed-loop control is carried out by the control 80, but may also be formed by a unit separate from the latter. The control 80 may also be included in the control unit 29 of the laser sintering device 1 or be allocated to the post-treatment device 100.

Figure 3:
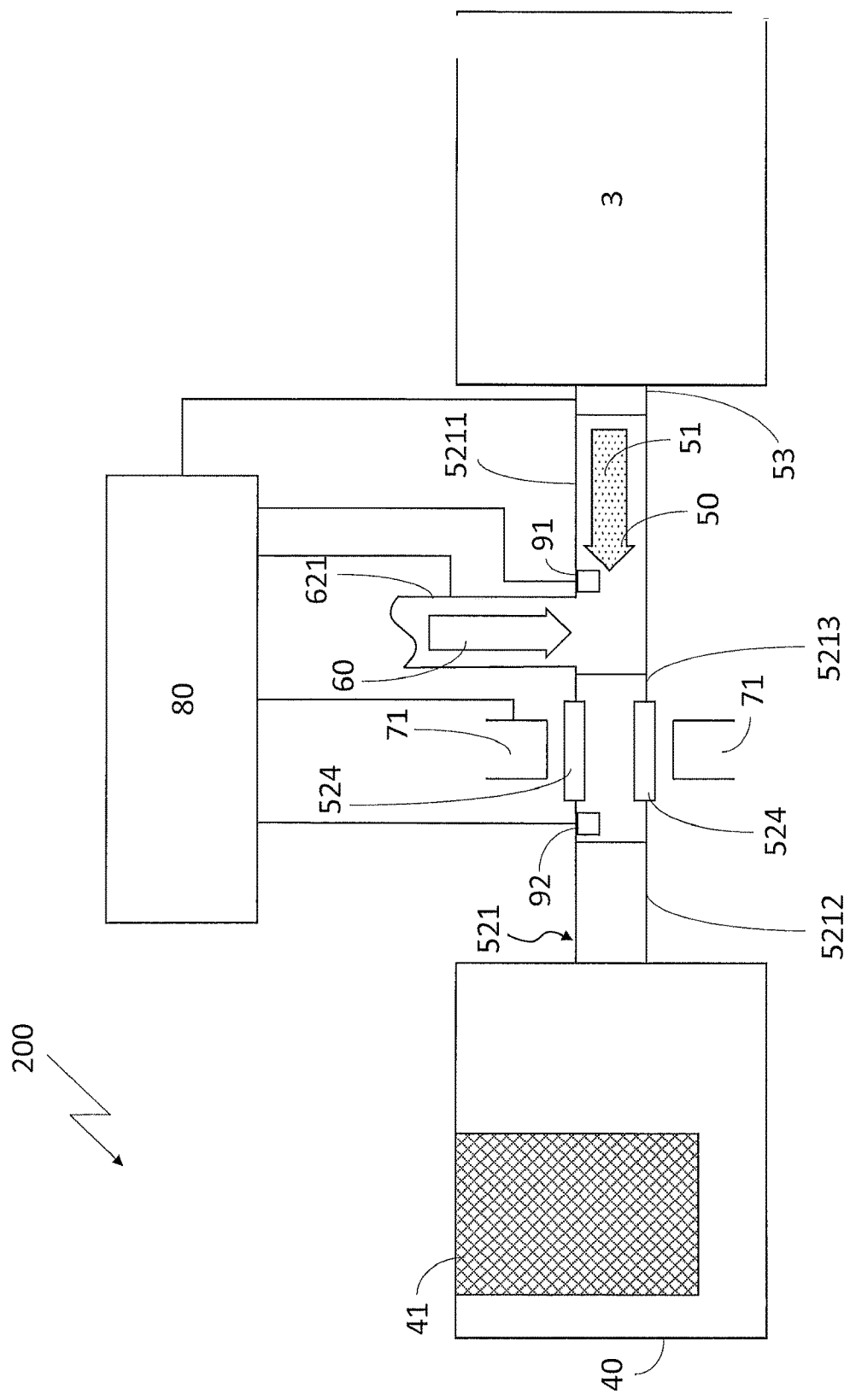
FIG. 3 is a schematic view, partially shown as sectional view, of a post-treatment device for a post-treatment of particles carried along in a process gas of a device for the generative manufacturing of a three-dimensional object in connection with a device according to FIG. 1 according to a second embodiment of the invention, in which in an embodiment the supply of the oxidant and the device for initiating the oxidation reaction may be associated with the supply of the process gas.

In contrast to the first embodiment shown in FIG. 2, in the post-treatment device 200 according to a second embodiment shown in FIG. 3, the oxidant supply 621 and the energy input source in the form of a radiation heater 71 are associated with the supply 521 of the process gas 50 and the particles 51 entrained therein. The supply 521 comprises a supply section 5211 facing the process chamber 3, a supply section 5212 facing the filter chamber 40, and an intermediate section 5213. The oxidant supply 621 supplies the oxidant 60 to the process gas 50 carrying the particles 51 in the supply section 5211 facing the process chamber 3. Alternatively, the supply may also be provided in the intermediate section 5213, in particular upstream of the radiation heater 71 acting in the intermediate section 5213, or in the supply section 5212 facing the filter chamber 40. The intermediate section 5213 is designed in such a way that it can be inserted between the supply section 5211 facing the process chamber 3 and the supply section 5212 facing the filter chamber 40. Accordingly, the intermediate section 5213 may be a retrofit kit that easily allows for adaptation of conventional equipment into a post-treatment device for the post-treatment of particles carried in a process gas 50. Here, the intermediate section 5213 has a circumferential radiation-transparent portion 524 through which energy from an energy input source 71 also circumferential about a longitudinal axis of the intermediate section 5213 is coupled into the intermediate section 5213.

In the post-treatment device 200 according to FIG. 3, the oxidant 60 is first supplied to the process gas 50 carrying the particles 51 in the supply section 5211 facing the process chamber 3 via the oxidant supply 621 such that the particle environment of the particles 51 carried in the process gas 50 is permeated with the oxidant 60. The mixture of the process gas 50 carrying the particles 51 and the oxidant 60 passes through the intermediate section 5213, in which the oxidation reaction is initiated via the energy input source 71. For process monitoring and closed-loop control based thereon by the control 80, a sensor 91 is provided for detecting the amount of particles 51 entrained in the process gas 50 in the supply section 5211 facing the process chamber 3, and a sensor unit 92 is provided for measuring the temperature and the oxidant content in the intermediate section 5213.

In the fourth embodiment of the post-treatment device 300 shown in FIG. 4, the oxidant supply 622 is connected to the filter chamber 40 in such a way that the oxidant supply 622 is directed substantially towards the filter 41 and thus the oxidant 60 flows around the filter 41 or the filter 41 is penetrated by the oxidant 60. This allows the oxidant 60 to be efficiently supplied to the particles 51 entrained in the process gas 50 at the filter 41. Particularly in the case of a non-continuously provided targeted oxidation reaction, the largest accumulation of particles 51 to be brought to the targeted oxidation reaction is to be assumed at the filter. In a further development, the filter 41 may further comprise a resistance heater in the form of a heating wire 72 incorporated into or surrounding the filter fabric, which serves as an energy input source to initiate the oxidation reaction. As already explained, the temperature input by the heating wire may also be additionally used to support an oxidation reaction initiated by other means. In addition, a process monitoring system 90 is provided which may, for example, provide information to the control 80 regarding the oxidant content, the temperature and/or the amount of particles 51 entrained in the process gas 50.

In one embodiment, the process monitoring 90 detects the amount of particles 51 conducted to the filter chamber 40 and/or the filter 41 in order to initiate the oxidation reaction with the addition of the oxidant 60 by the heating wire 72 when a predetermined amount of particles 51 is reached. Preferably, an oxidation reaction is effected such that the particles 51 burn off at the filter 41. Alternatively, in addition to the amount of particles 51, a predetermined period of time may be used as a criterion for initiating an oxidation reaction. In a further alternative, a further triggering event may also be provided, for example by instruction of the operator before the filter chamber 40 is opened to remove the filter 41. On the one hand, the various alternatives may be transferred to the other embodiments, but on the other hand, they may also be combined with each other. The addition of the oxidant 60 via the oxidant supply 622 may be controlled in such a way that the oxidant 60 is made available to the filter chamber 40 when the oxidation reaction is initiated or is to be initiated. Alternatively, at least a minimum level of oxidant content may in principle be continuously supplied to the filter chamber 40 or supplied such that the minimum level is maintained in the filter chamber 40. In the first variant, an oxidation reaction with the oxidant 60 is avoided as long as no initiation of the oxidation reaction is provided. In the second variant, for example passivation of the particles 51 may be supported such that the burn-off resulting from the initiation of the oxidation reaction is directed at the particles 51 that have not been sufficiently inhibited in their tendency to burn and explode by the passivation. Here, too, a combination of the variants may be provided in the sense of a comparatively low constant oxidant content in the filter chamber 40 or on the filter 41 and an increase in the oxidant content at predetermined times, i.e. for example when a predetermined amount of particles 51 is reached, after a predetermined period of time, or on demand.

The invention claimed is:

1. A method for a post-treatment of particles carried along in a process gas of a device for the generative manufacturing of three-dimensional objects, comprising:
   conducting the particles to a filter chamber via a supply of the process gas;
   adding an oxidant to the particles, wherein the oxidant is supplied to a particle environment and/or is present in a particle environment which is formed by the process gas, the oxidant being added to the particles prior to the particles reaching the filter chamber or within the filter chamber;
   initiating an oxidation reaction of the particles with the oxidant; and
   recirculating the process gas,
   wherein the process gas is a gas discharged from a process chamber of the device for the generative manufacturing.

2. The method according to claim 1,
   wherein the oxidant is supplied to a particle environment and/or is present in a particle environment, which is provided in the form of an inert gas.

3. The method according to claim 1,
   wherein the oxidant is provided in the form of oxygen.

4. The method according to claim 3,
   wherein a volume fraction of oxygen, of at least 0.01 vol. % and at most 20 vol. %, relative to the particle environment, is added to the particles.

5. The method according to claim 1,
   wherein the particles are heated to a temperature of at least 50° C. and at most 650° C.

6. The method according to claim 1,
   wherein an oxygen content surrounding the particles, and/or the temperature of the particle environment and/or of the particles themselves is or are detected and influence(s) the control of an oxidant supply and/or of a heating device and/or of an outlet.

7. A post-treatment device for post-treatment of particles carried along in a process gas of a device for the generative manufacturing of three-dimensional objects, comprising:
   a filter chamber that receives the particles conducted thereto, the filter chamber comprising at least one filter arranged therein, wherein the process gas is a gas discharged through an outlet from a process chamber of the device for the generative manufacturing and supplied to the filter chamber via a supply of the process gas;
   an oxidant supply for the addition of oxidant to the particles, wherein the oxidant supply is connected to the supply of the process gas and/or connected to the filter chamber and/or wherein the oxidant supply is directed towards the at least one filter in the filter chamber, such that the oxidant is added to the particles prior to the particles reaching the filter chamber or is added within the filter chamber;
   a device for initiating an oxidation reaction of the particles with the oxidant; and
   a process gas supply associated with the process chamber and that recirculates the process gas from the post-treatment device to the process chamber.

8. The post-treatment device according to claim 7, further comprising a closed-loop control that controls the oxidant supply in such a way that the oxidant is supplied continuously, periodically, or variably.

9. The post-treatment device according to claim 7, further comprising at least one energy input source whose energy input is effected from outside the filter chamber through a radiation-transparent portion, in an interior of the filter chamber and/or from inside the filter chamber through an energy input element integrated in the at least one filter.

10. The post-treatment device according to claim 9,
    wherein the at least one energy input source is a heating device.

11. The post-treatment device according to claim 7,
further comprising a process monitoring device that monitors an oxygen content, the particle amount, and/or the temperature.

12. The post-treatment device according to claim 8,
wherein, during operation, the control controls the oxidant supply and/or an energy input source and/or an outlet on the basis of the process monitoring.

13. The method according to claim 1,
wherein the oxidant is added to the particles by an oxidant supply being associated with a supply of the process gas and/or being connected to the filter chamber.

14. The method according to claim 1,
wherein the oxidant is added to the particles such that the oxidation reaction takes place before the particles reach the filter chamber and/or such that the oxidation reaction is limited to the region of the filter chamber.

15. The method according to claim 1,
wherein the oxidation is initiated by an energy input and/or a catalyst and/or adding activating agents and/or electrolysis.

16. The method according to claim 1, further comprising:
heating the particles are heated,
wherein the process gas is an inert gas or comprises an inert gas.

* * * * *